United States Patent [19]
Leopard et al.

[11] 3,939,476
[45] Feb. 17, 1976

[54] PASSIVE RANGING TAIL WARNING DEVICE

[76] Inventors: George W. Leopard, Rte. 1, Box 314C, Lexington Park, Md. 20653; Kirby Hair, 9375 Knotte Ave., Anaheim, Calif. 92804

[22] Filed: May 19, 1959

[21] Appl. No.: 814,353

[52] U.S. Cl.... 343/112 R; 343/112 CA; 343/112 D
[51] Int. Cl.² .......................... G01S 9/04; G08G 5/04
[58] Field of Search................ 343/12, 112.4, 112 D

[56] References Cited
UNITED STATES PATENTS

| | | | |
|---|---|---|---|
| 2,568,568 | 9/1951 | Stansbury | 343/112 CA |
| 2,837,738 | 6/1958 | Van Valkenburgh | 343/112 R |

Primary Examiner—Maynard R. Wilbur
Assistant Examiner—Richard E. Berger
Attorney, Agent, or Firm—R. S. Sciascia; P. Schneider; R. Beers

EXEMPLARY CLAIM

1. A system for passively measuring the range between a given point and a second point from which detectable radiations having distinguishable characteristics are emanating, comprising means for receiving at said given point direct radiations from said second point and indirect radiations from said second point which have been reflected from a reflecting surface, means for measuring the angle of elevation of said second point from said given point, means for measuring the altitude of said given point relative to said reflecting surface, a gate circuit for rejecting all direct signals which are not followed by a reflecting signal within a predetermined time span, and computing means for determining the range from said given point to said second point as a function of said direct and reflected signal, said angle of elevation, and said altitude of said given point.

5 Claims, 8 Drawing Figures

INVENTORS
GEORGE W. LEOPARD
KIRBY HAIR

BY R. S. Tompkins

INVENTORS
GEORGE W. LEOPARD
KIRBY HAIR

FIG. 7

PASSIVE RANGING TAIL WARNING DEVICE

The invention described herein may be manufactured and used by or for the Government of the United States of America for governmental purposes without the payment of any royalties thereon or therefor.

The present invention relates to a passive range measuring and warning device and more particularly to a passive range measuring and warning device wherein the range is determined by means of radiant energy emitted from a point and observing both a signal received directly from the point and the reflection of the signal from another surface.

There are at present three systems in use for warning a pilot of other aircraft in vicinity. They are passive, transponder, and tail warning. The passive system consists of a receiver which detects signals from the radar transmitter in another aircraft and causes an alarm to be actuated. The transponder system requires a cooperating transponder to be located in the unknown aircraft which is interrogated by the pilot in the aircraft being protected. The radar tail warning system employs radar echoes and indicates position and range of other aircraft located in a cone off the tail of the protected aircraft.

The disadvantages of the above mentioned systems are: the passive system furnishes an indication of all radar signals within the frequency range of the device, but due to the differing power and pulse characteristics of the various types of radar employed by different aircraft, no accurate determination of range is possible. Further, the system is triggered by ground radar pulses and there is no means of distinguishing the latter from the airborne radar radiations. The transponder system requires an electronic interrogating device in each aircraft and, thus, is not a fail-safe system. Also the receiver is plagued by ground reflected pulse signals which cause confusion. And the radar tail warning system requires very expensive equipment whose range is limited due to the extremely small radar cross section area of modern fighter aircraft and the confusion of ground echoes.

Accordingly an object of the present invention is to overcome the above mentioned disadvantages of known systems.

Another object of the invention is the provision of a system which will provide the pilot of an aircraft with an accurate reliable warning of the presence of other aircraft in the vicinity and to provide information in a passive manner.

A further object is to provide a system which will provide a warning of the presence of other aircraft in the vicinity to provide range information in a passive manner without the necessity of cooperative transmitting and receiving means.

Still another object is to provide a system whereby one aircraft in flight can determine the distance to a second aircraft in flight without disclosing its presence to the second aircraft.

Other objects and many of the attendant advantages of this invention will be readily appreciated as the same becomes better understood by reference to the following detailed description when considered in connection with the accompanying drawings wherein.

Figure 1:
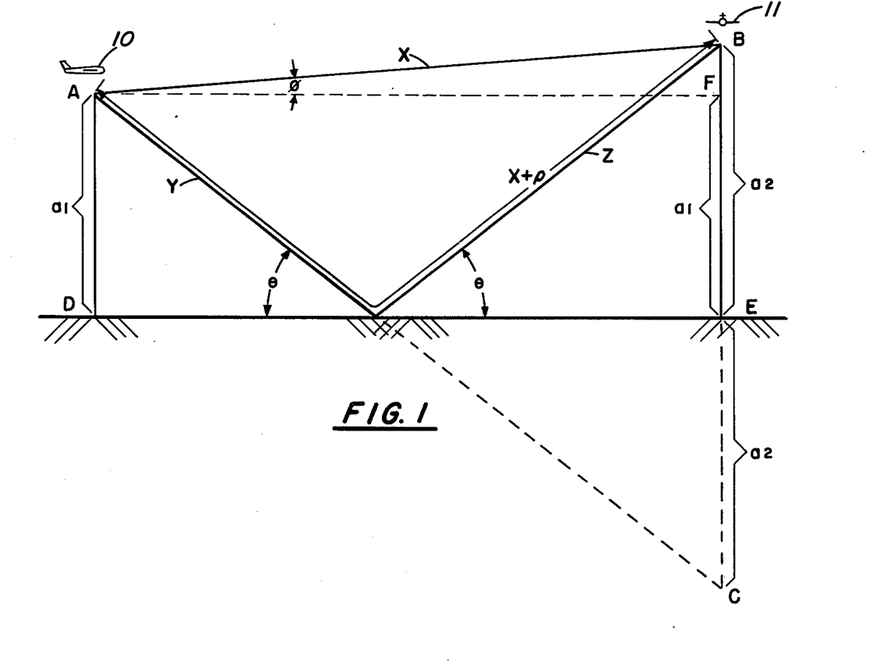
FIG. 1 is a diagram representing the relations between two aircraft, the ground, and the direct and reflected paths of electromagnetic energy.

Referring now to the drawings, wherein like reference characters designate like or corresponding parts throughout the several views, there is shown in FIG. 1 two aircrafts 10 and 11 separated from each other by range, X, and at altitudes a1 and a2 respectively. A pulse transmitted from aircraft 10 will be received at aircraft 11 along two paths, direct and ground reflected. The direct path is X and the reflected ground path is $X + \rho$. If the altitudes of both aircraft are known, an expression for the range, X, can be derived in terms of the altitudes and the differences in the path length traveled by the direct and the reflected pulses. This difference in path length is readily determined from the difference in the time of arrival of the two pulses at aircraft 11. By Pythagoras theorem and from FIG. 1;

$$X^2 = \overline{BF}^2 + \overline{AF}^2 = (\overline{BE} - \overline{FE})^2 + \overline{DE}^2 = (a_2 - a_1) + \overline{DE}^2 \quad (1)$$

also, by construction and the same theorem, $$(X + \rho)^2 = \overline{AC}^2 = \overline{FC}^2 + \overline{AF}^2 = (a_2 + a_1)^2 + \overline{DE}^2 \quad (2)$$

Subtracting (1) from (2)

$$(X + \rho)^2 - X^2 = (a_2 + a_1)^2 + \overline{DE}^2 - [(a_2 - a_1)^2 + \overline{DE}^2]$$

$$2X\rho = 4a_1 a_2 - \rho^2$$

$$X = \frac{4a_1 a_2 - \rho^2}{2\rho} \quad (3)$$

The altitudes of both aircraft are known in certain types of operations but in others this information is not available. In this case an expression can be derived in terms of the difference in path length, $\rho$, the protected aircraft altitude and the angle $\phi$ shown in FIG. 1.

$$\sin \phi = \frac{\overline{BF}}{\overline{AB}} = \frac{a_2 - a_1}{X}$$

Solving, $a_1 = a_2 - X \sin \phi$

Substituting this value of $a_1$ in the above expression for X [ eq. (3) ] :

$$X = \frac{4a_2 (a_2 - X \sin \phi) - \rho^2}{2\rho}$$

Again solving for X, we obtain:

$$X = \frac{4a_2^2 - \rho^2}{2(\rho + 2a_2 \sin \phi)} \quad (4)$$

Figure 2:
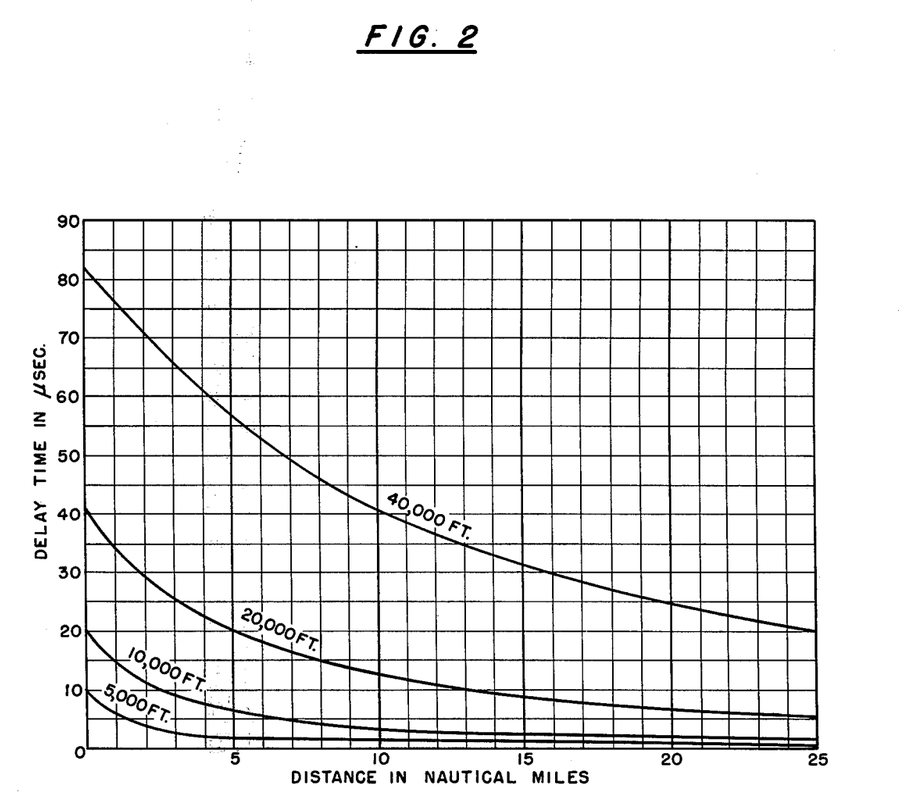
FIG. 2 is a diagram showing by graphical representations the relationships between range and reflected pulse delay time for two aircraft at the same altitude.
Figure 3:
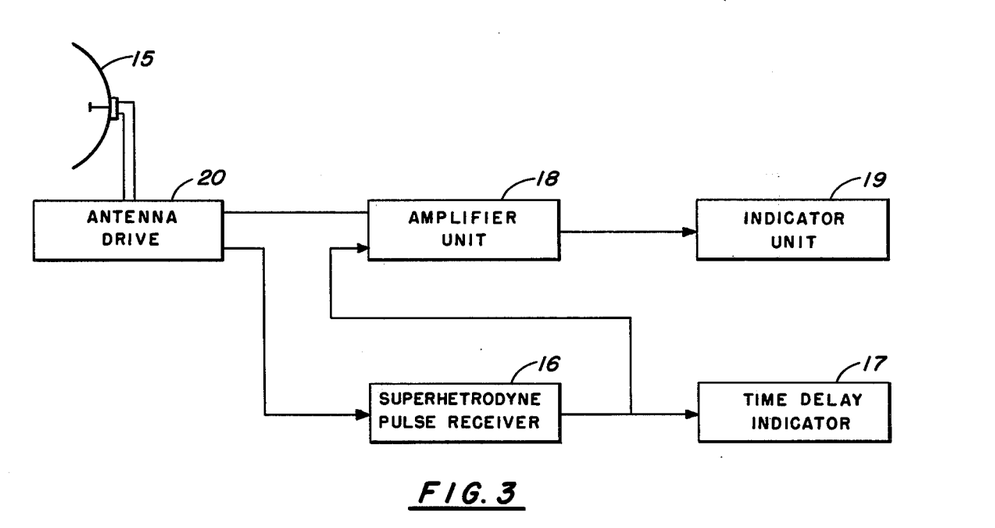
FIG. 3 is a simplified block diagram showing a range measuring system in accordance with one embodiment of the invention.

FIG. 2 relates time delay of received pulses for various altitudes of both aircraft to range separation, X, in nautical miles. These relationships were determined by measuring at aircraft 11 the lag time of a reflected pulse over a direct pulse. FIG. 3 shows such a system for measuring the time lag.

Figures 4, 8:
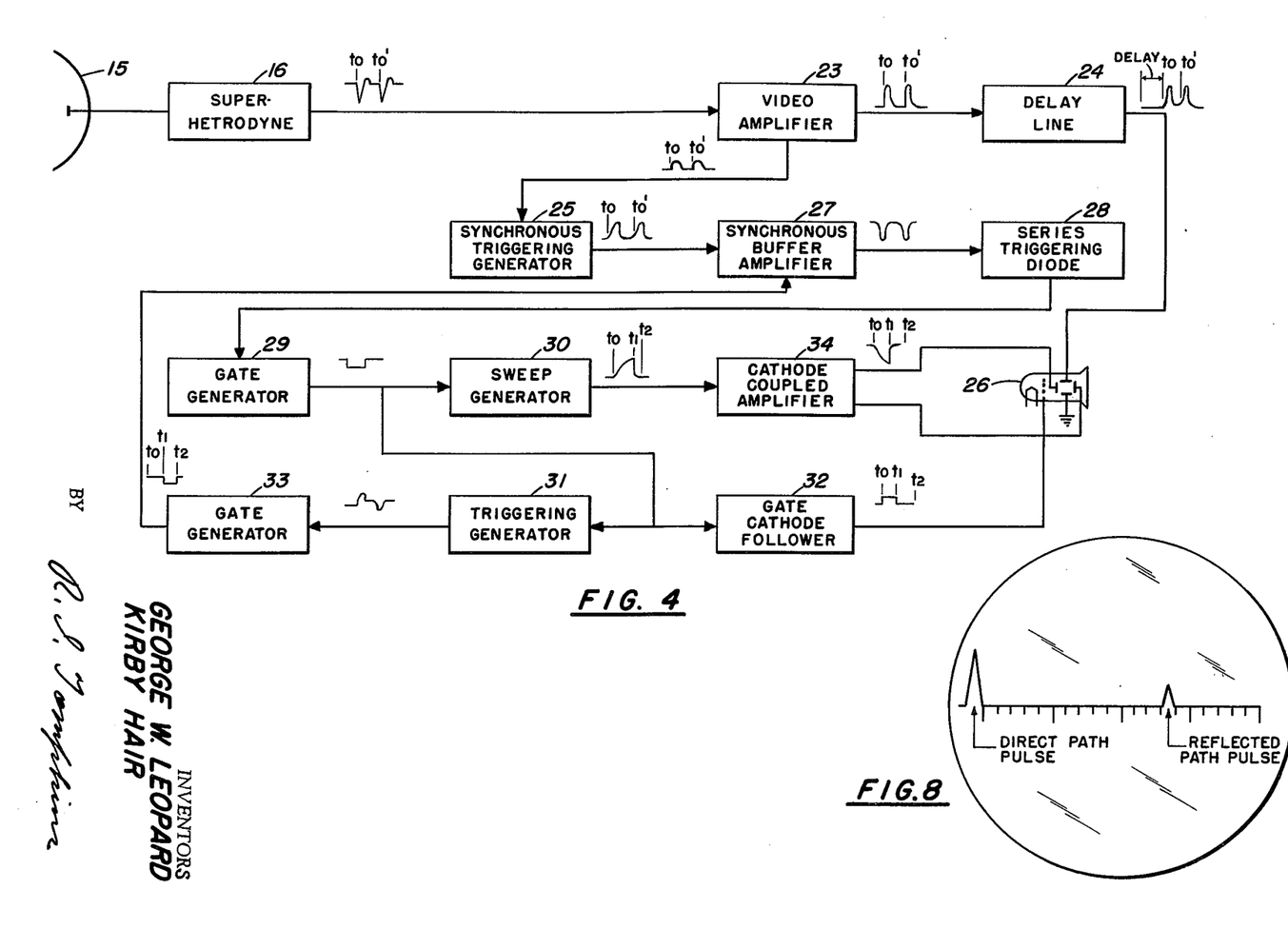
FIG. 4 is a block diagram illustrative of a time delay indicator for use with the system of FIG. 3.
FIG. 8 is an illustration of the information presented by the time delay indicator of FIG. 4.

The system of FIG. 3 is suitable for use in measuring the distance to an airborne pulse type radar such as may be used for navigational purposes or for aircraft detection and tracking. Antenna 15 is adapted to receive both direct and reflected pulses. Pulse signals received at antenna 15 are amplified and detected by receiver 16 which passes a video output to a time measuring device 17, which may be a precision cathode ray oscilloscope whose sweep is calibrated directly in microseconds. The operation of time measuring device 17 is shown in FIG. 4. The video output of receiver 16 is also amplified in amplifier 18 and coupled to indicator unit 19 which may be the usual plan position indicator. An antenna position signal is coupled from antenna drive 20 to indicator unit 19 to provide a horizontal scanning voltage.

Referring now to FIG. 4, pulse signals received at antenna 15 are detected in receiver 16 and amplified in video amplifier 23. Amplifier 23 applies the amplified video signal to delay line 24 and a synchronizing pulse simultaneously to trigger generator 25. The signal applied to delay line 24 is delayed with respect to the synchronous signal applied to trigger generator 25. The delayed signal is applied as the video input to the vertical plates of cathode ray oscilloscope 26. Positive triggers from trigger generator 25 are applied to buffer amplifier 27 which inverts the trigger and applies it to gate generator 29 through triggering diode 28. Gate generator 29 provides a negative gate which is applied to the input of sweep generator 30 and a positive gate which is applied to triggering generator 31 and cathode follower 32. Gate generator 33 responds to the negative triggers from trigger generator 31 and provides a negative gate which is fed back to buffer amplifier 27. Triggering generator 31 and gate generator 33 together form a lockout circuit. The negative gate from gate generator 33 is coupled back to synchronous buffer amplifier 27 to reject all unwanted initiating triggers during the recovery time of the sweep. Cathode follower 32 provides an unblanking gate which is coupled to the grid of cathode ray tube 26.

The output of sweep generator 30 is coupled to the input of cathode coupled amplifier 34. Through conventional amplifier and phase splitting action, amplifier 34 provides sweep voltages to the horizontal plates of cathode ray tube 26. A direct received pulse and a reflected pulse would appear on the face of cathode ray tube 26 as shown in FIG. 8. The distance between the pulses is the time lag, and knowing the relationships between time lag and range, tube 26 is calibrated to read range directly.

Figure 5:
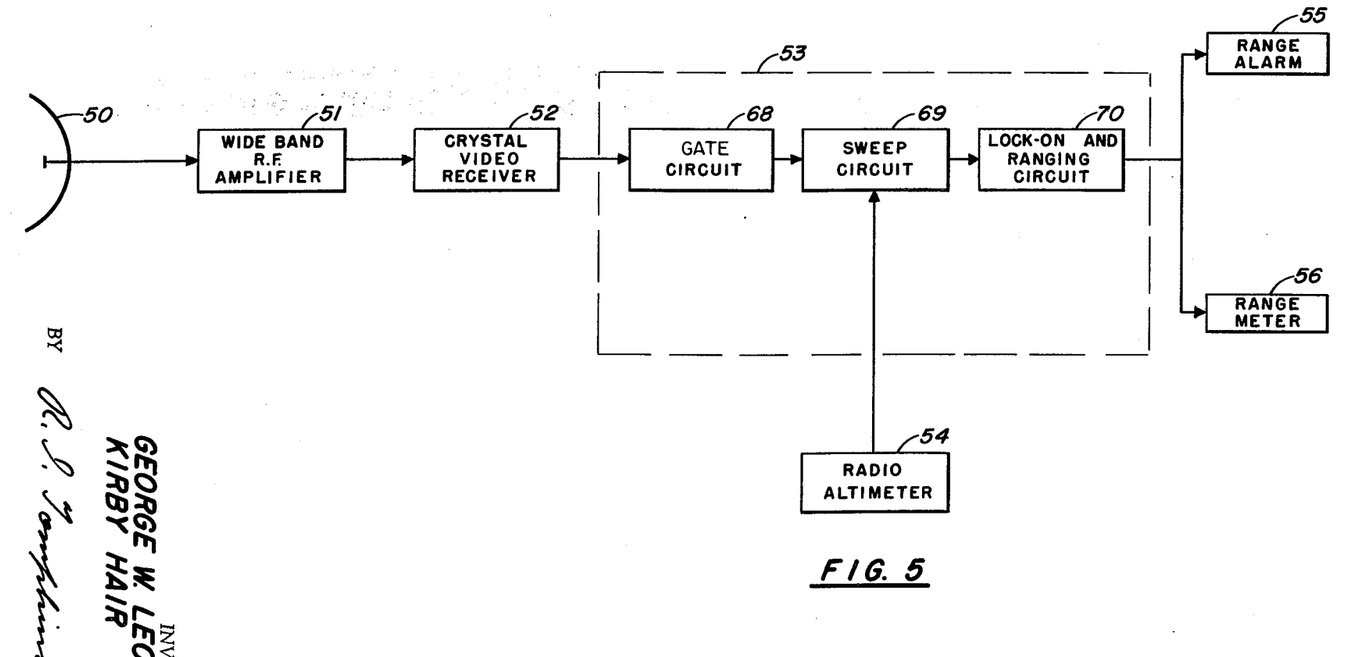
FIG. 5 is a simplified block diagram of a tail warning device with passive ranging in accordance with still another embodiment of the invention.

FIG. 5 shows a system similar to that shown in FIG. 3. This system employs an antenna 50, wideband radio frequency amplifier 51, crystal video receiver 52, computer 53, radio altimeter 54, range alarm 55, and range meter 56. Computer 53 includes a gate circuit 68, sweep circuit 69 and lock on and ranging circuit 70. Computer 53 may be of the airborne radar range computer type shown and described in Navy publication AN16-30APG-30-3. That range computer may be modified by changing the sweep circuit to produce an output voltage varying in the approximate form of the curves of FIG. 2. The output from altimeter 54 is coupled as an input to sweep circuit 69 and causes the sweep to be shifted right and left and the sweep speed to be changed to make altitude corrections for the aircraft in which the device is installed. Gate circuit 68 rejects all signals not followed within a predetermined interval by another pulse, thus rejecting ground based and distant radar transmitter signals. This may be done by well known conventional circuits.

Range alarm 55 is actuated when the detected aircraft or object closes to a preset range. Range meter 56 may be a voltmeter calibrated in nautical miles.

In operation the altitude of the transmitting aircraft is ignored, since this is a tail warning device and furnishes correct range information only for other aircraft at the same altitude. If the other aircraft is at a lower altitude, the indicated range will be too great, since the delay will be less than for two aircraft at the same altitude. Conversely, if the other aircraft is at a higher altitude, the true range will be less than that indicated. When the "enemy" is at a disadvantage, at a lower altitude, the warning comes late and when the "enemy" has the advantage at a higher altitude, the warning comes early.

Figure 6:
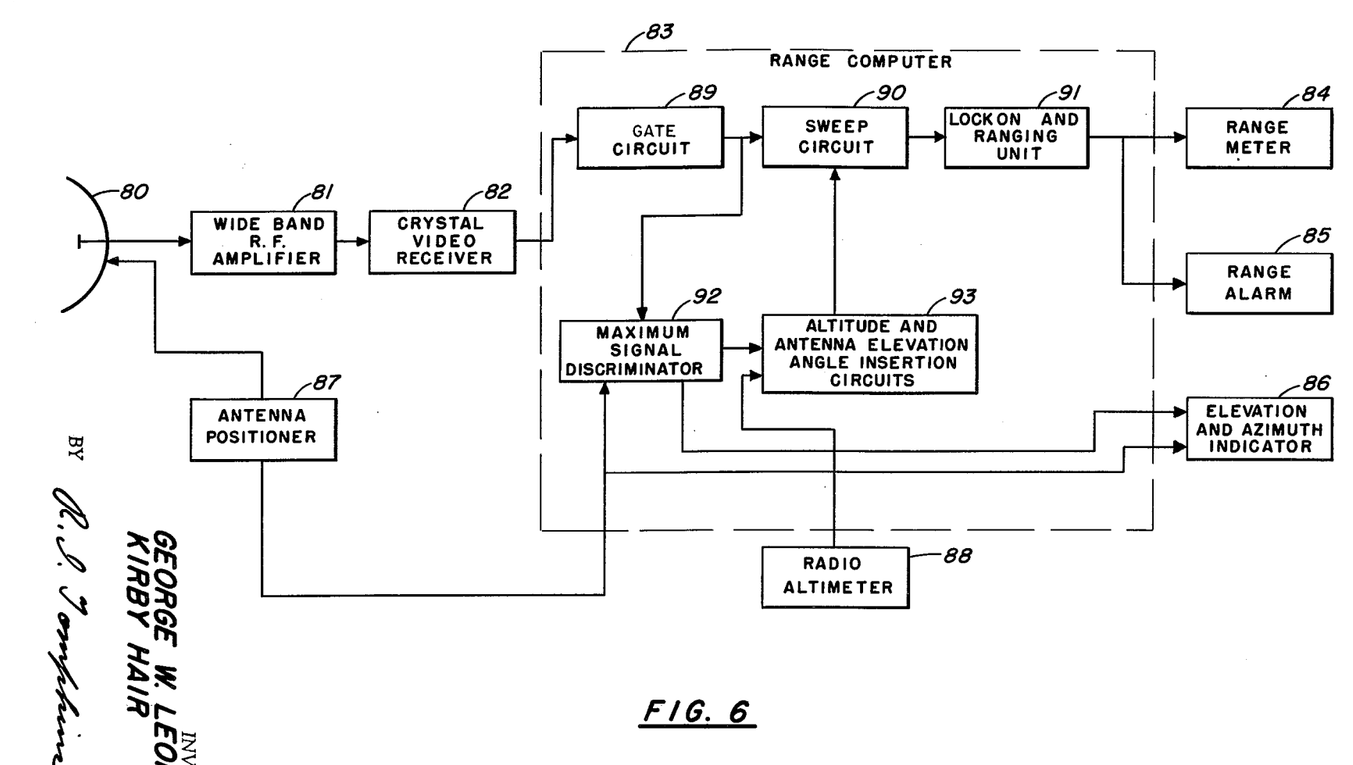
FIG. 6 is a block diagram of a tail warning device with accurate range and position information in accordance with a further embodiment of the invention.

The system of FIG. 6 is a tail warning device having antenna 80 adapted for mounting in the tail of the protected aircraft. Received pulses are amplified in radio frequency amplifier 81 which may be a low noise traveling wave tube, parametric or other extremely low noise radio frequency amplifier stage, and coupled to crystal video receiver 82, preferably of the "wide open" frequency type. The detected output of receiver 82 is coupled to the input of range computer 83. Range computer 83 provides outputs to range meter 84, range alarm 85 and elevator and azimuth indicator 86. Antenna positioner 87 furnishes antenna position information to range computer 83 and azimuth and elevation information to indicator 86 in the well known manner of using either synchros or potentiometer circuits. Altitude information is furnished to range computer 83 by radio altimeter 88.

Range computer 83 includes gate circuit 89, sweep circuit 90, lock on and ranging circuit 91, maximum signal discriminator 92, and altitude and antenna elevation angle insertion circuit 93.

In operation, antenna 80 passes the intercepted pulse signals to amplifier 81 which accepts a wide band of frequencies. Receiver 82 detects the signal received from amplifier 81 and passes it as an input to gate circuit 89 of range computer 83. Gate circuit 89 rejects all signals not followed by a reflected path pulse within 100 microseconds, which is the approximate time required for a pulse to be transmitted to the earth's surface directly below an airplane at an altitude of 50,000 feet and return. The accepted signals are passed to sweep circuit 90 and lock-on and ranging unit 91. The voltage reference level and the rate of sweep are modified by the inputs from altitude and angle of elevation insertion circuit 93 to make the sweep correction for the aircraft's own altitude and the elevation angle of the antenna (corresponding to the other airplane's altitude).

Maximum signal discriminator 92 contains a memory circuit which remembers the amplitude of the maximum signal received during each complete azimuth and elevation sweep cycle and the position (in azimuth and elevation) of the antenna at the time the maximum signal was received. It must be remembered that the maximum signal via the direct path is normally received when the antenna is pointed directly at the "enemy" airplane, whereas the maximum reflected signal is received with the antenna pointed below the horizon. Thus, the range information is received at a time in the antenna sweep cycle different from the time of receiving the maximum signal which is normally received via the direct path. At the end of each antenna sweep cycle, the memory circuit applies a sweep modification voltage to change the range sweep reference level and its rate of sweep to correspond to the elevation angle of the "enemy" airplane. In addition, this information is placed on the vertical and horizontal deflection plates of the cathode ray tube azimuth and elevation indicator 86, together with a momentary intensifying voltage. In addition, an alternating voltage is superimposed on the horizontal deflection plates to indicate to the pilot which signal is maximum, which is assumed to be the nearest transmitting airplane.

Altitude and antenna elevation angle insertion circuit 93 generates a voltage proportional to the altitude of the protected aircraft, which together with the output of the maximum signal discriminator results in the total modifying voltages for the range sweep to correct for the altitudes of the two aircraft. These voltages are then transmitted to the sweep circuit, resulting in modification of the range sweep rate and the range sweep reference level. This circuit is activated only during cycles that a signal is passed by gate circuit 89.

Figure 7:
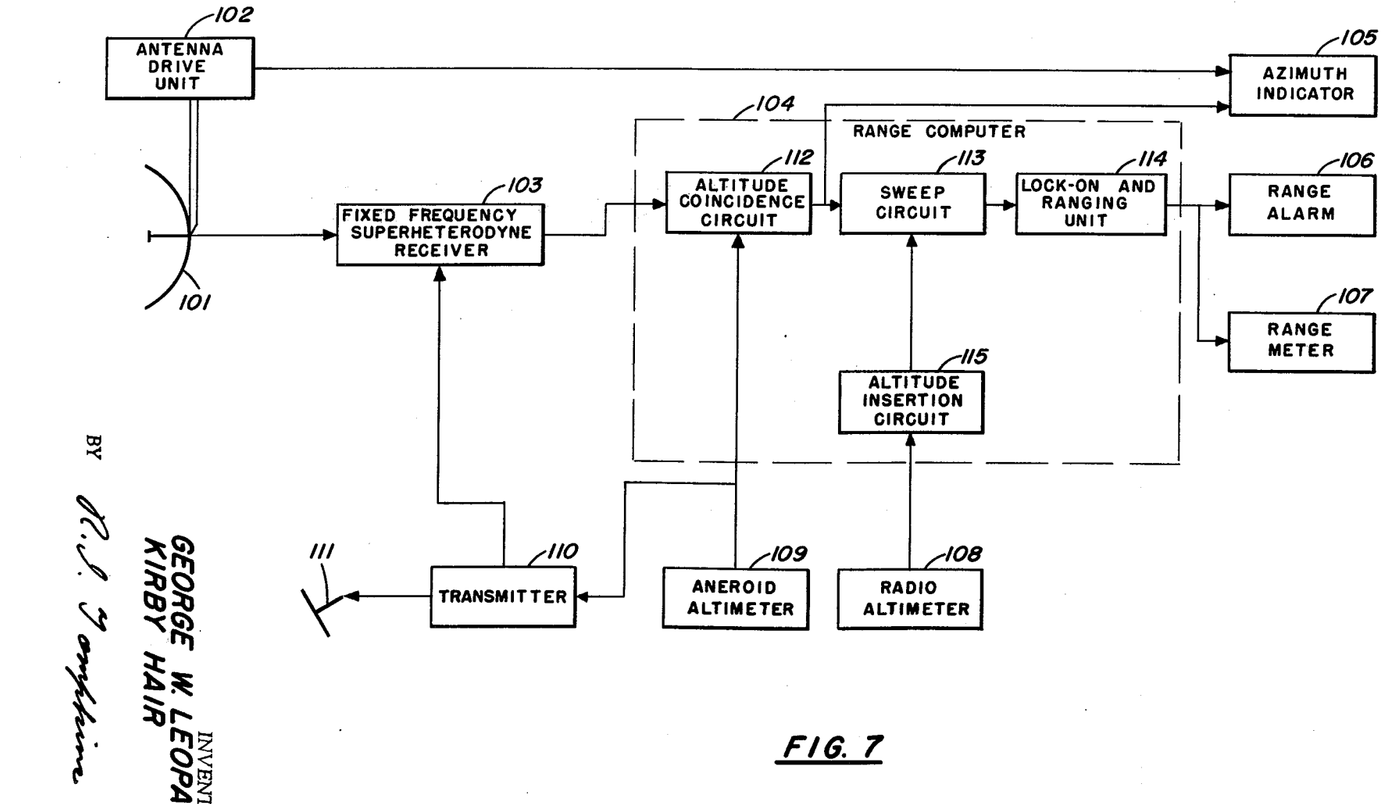
FIG. 7 is a block diagram showing a passive proximity warning device in accordance with still a further embodiment of the invention.

The system of FIG. 7 is a passive proximity warning device for use by aircraft in collision avoidance. The system comprises a receiver antenna 101, antenna drive unit 102, a fixed frequency superhetrodyne receiver 103, range computer 104, azimuth indicator 105, range alarm 106, range meter 107, radio altimeter 108, aneroid altimeter 109, transmitter 110 and transmitting antenna 111. Range computer 104 includes altitude gate circuit 112, sweep circuit 113, lock-on and ranging unit 114, and altitude insertion circuit 115.

In operation, this system requires a transmitter in the other aircraft and is shown as transmitter 110 on the protected aircraft. Transmitter 110 employs a horizontally polarized antenna 111 and has a crystal controlled frequency, common with all cooperating aircraft, and pulse characteristics specified by regulating agencies. The repetition frequency of the pulse transmitted is varied inversely proportional to the altitude. This control is provided by altimeter 109 as described below.

Antenna 101 rotates 360° and is preferably of the high gain parabolic dish antenna type. The elevation is fixed in a position approximately 15° below the horizontal to give preference to the signal arriving via the reflected path. Antenna drive unit 102 drives antenna 101 and furnishes azimuth information to azimuth indicator 105. Receiver 103 is made inactive during the transmission period of transmitter 110 by applying in any well known manner a suppression pulse from transmitter 110 to receiver 103.

Range computer 104 is essentially the same as computer 83 of FIG. 6 except that gate circuit 89 accepts signals of only the repetition rate corresponding to the altitude set into it by the output from aneroid altimeter 109. Radio altimeter 108 furnishes an output proportional to the terrain clearance of the airplane, from which a voltage is generated by altitude insertion circuit 115 and coupled to correct the output of range sweep 113.

The pulse repetition frequency may be varied by means of a potentiometer driven by aneroid altimeter 109; the same output as that employed by altitude coincidence circuit 112. To prevent warning failure due to pulse trains, the pulse train is interrupted momentarily and shifted randomly in phase of the pulse repetition frequency at frequent intervals. This may be accomplished in the transmitter mechanically by means of a motor driven cam arrangement. The shift of phase of the pulse train should occur 5 to 10 times per minute.

Obviously many modifications and variations of the present invention are possible in the light of the above teachings. It is therefore to be understood that within the scope of the appended claims the invention may be practiced otherwise than as specifically described.

What is claimed is:

1. A system for passively measuring the range between a given point and a second point from which detectable radiations having distinguishable characteristics are emanating, comprising means for receiving at said given point direct radiations from said second point and indirect radiations from said second point which have been reflected from a reflecting surface, means for measuring the angle of elevation of said second point from said given point, means for measuring the altitude of said given point relative to said reflecting surface, a gate circuit for rejecting all direct signals which are not followed by a reflecting signal within a predetermined time span, and computing means for determining the range from said given point to said second point as a function of said direct and reflected signal, said angle of elevation, and said altitude of said given point.

2. A system for measuring the range between a given point and a second point from which detectable radiations having distinguishable characteristics are emanating, said system comprising means for receiving at said given point direct radiations from said second point and indirect radiations from said second point which have been reflected from a reflecting surface, means for measuring the angle of elevation of said second point from said given point, means for measuring the altitude of said given point relative to said reflecting surface, means for splitting the received signals into two paths, a delay line located in one of the paths, gate and triggering generators located in the other path, and time delay indicator means connected between the two paths responsive to said direct and reflected radiations for indicating the range between said given point and said second point.

3. The system of claim 2 wherein said time delay indicator means is a cathode ray oscilloscope whose sweep is calibrated directly in microseconds.

4. A system for measuring the range between a first aircraft and a second aircraft from which detectable radiations having distinguishable characteristics are emanating, comprising means for receiving at said first aircraft direct radiations from said second aircraft and indirect radiations from said second aircraft which have been reflected from a reflecting surface, means for measuring the angle of elevation of said second aircraft from said first aircraft, an altimeter, a gate circuit for rejecting all signals not followed within a predetermined interval by another signal, a ranging circuit combining the output of the altimeter and the gate circuits for providing an output signal proportional to the range between said first and second aircraft, and alarm means responsive to said ranging circuit output for warning the pilot of said first aircraft when the range between the two aircraft closes to a predetermined value.

5. A system for passively measuring the range between a given point and a second point from which detectable radiations having distinguishable characteristics are emanating, comprising means for receiving at said given point direct radiations from said second point and indirect radiations from said second point which have been reflected from a reflecting surface, means for measuring the altitude of said given point relative to said reflecting surface, means for measuring the angle of elevation between the second point and the given point, a gate circuit for rejecting all signals not followed within a predetermined interval by another signal, and a ranging circuit combining the outputs of the altitude measuring means and the gate circuit for providing an output voltage proportional to the range from said given point to said second point in response to said direct and reflected signals and said altitude of said given point.

* * * * *